(12) United States Patent
Taylor et al.

(10) Patent No.: US 10,371,377 B2
(45) Date of Patent: Aug. 6, 2019

(54) PULVERIZED FUEL-OXYGEN BURNER

(71) Applicant: Honeywell International Inc., Morris Plains, NJ (US)

(72) Inventors: Curtis Taylor, Gaston, IN (US); Brad Patterson, Dunkirk, IN (US); Jayson Perdue, New Castle, IN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/679,944

(22) Filed: Aug. 17, 2017

(65) Prior Publication Data
US 2017/0343212 A1    Nov. 30, 2017

Related U.S. Application Data

(63) Continuation of application No. 14/372,309, filed as application No. PCT/US2013/058129 on Sep. 5, 2013, now Pat. No. 9,752,777.

(51) Int. Cl.
*F23C 6/04* (2006.01)
*F23D 1/00* (2006.01)
*F23L 7/00* (2006.01)

(52) U.S. Cl.
CPC ............. *F23L 7/007* (2013.01); *F23C 6/045* (2013.01); *F23D 1/00* (2013.01); *F23C 2201/20* (2013.01); *F23D 2201/00* (2013.01); *F23D 2201/20* (2013.01); *F23D 2900/00006* (2013.01); *Y02E 20/344* (2013.01)

(58) Field of Classification Search
CPC ....... F23L 7/007; F23C 6/045; F23C 2201/20; F23D 1/00; F23D 2201/00; F23D 2201/20; F23D 2200/00; Y02E 20/344
See application file for complete search history.

(56) References Cited

U.S. PATENT DOCUMENTS

| 3,273,623 A | 9/1966 | Nesbitt |
| 4,928,605 A | 3/1990 | Suwa et al. |
| 5,062,789 A | 11/1991 | Gitman |

(Continued)

OTHER PUBLICATIONS

Second Office Action from China Patent Application No. 201380007202, dated Dec. 12, 2017, 14 pages.

(Continued)

*Primary Examiner* — David J Laux
(74) *Attorney, Agent, or Firm* — Brooks, Cameron & Huebsch, PLLC

(57) ABSTRACT

A burner assembly combines oxygen and fuel to produce a flame. The burner assembly includes an oxygen supply tube adapted to receive a stream of oxygen and a solid fuel conduit arranged to extend through the oxygen tube to convey a stream of fluidized, pulverized, solid fuel into a flame chamber. Oxygen flowing through the oxygen supply tube passes generally tangentially through a first set of oxygen-injection holes formed in the solid fuel conduit and off-tangentially from a second set of oxygen-injection holes formed in the solid fuel conduit and then mixes with fluidized, pulverized, solid fuel passing through the solid fuel conduit to create an oxygen-fuel mixture in a downstream portion of the solid fuel conduit. This mixture is discharged into a flame chamber and ignited in the flame chamber to produce a flame.

18 Claims, 9 Drawing Sheets

(56) References Cited

U.S. PATENT DOCUMENTS

| | | | |
|---|---|---|---|
| 5,104,310 A * | 4/1992 | Saltin | F23C 7/00 431/10 |
| RE39,425 E | 12/2006 | Taylor | |
| 2004/0211345 A1 | 10/2004 | Okazaki | |
| 2005/0132941 A1* | 6/2005 | Taylor | F23C 6/045 110/265 |
| 2008/0184919 A1 | 8/2008 | D'Agostini et al. | |
| 2009/0297996 A1 | 12/2009 | Vatsky et al. | |
| 2011/0127355 A1 | 6/2011 | Tamura et al. | |
| 2012/0152158 A1 | 6/2012 | Matsumoto | |
| 2012/0216730 A1* | 8/2012 | Belasse | F23D 1/00 110/347 |

OTHER PUBLICATIONS

International Search Report and Written Opinion from related PCT Application No. PCT/US2013/058129, dated Jan. 7, 2014, 7 pages.

\* cited by examiner

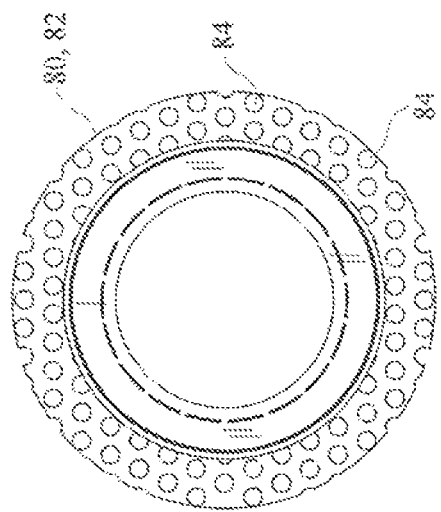
FIG. 11
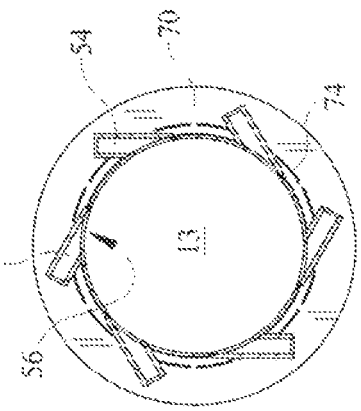
FIG. 10
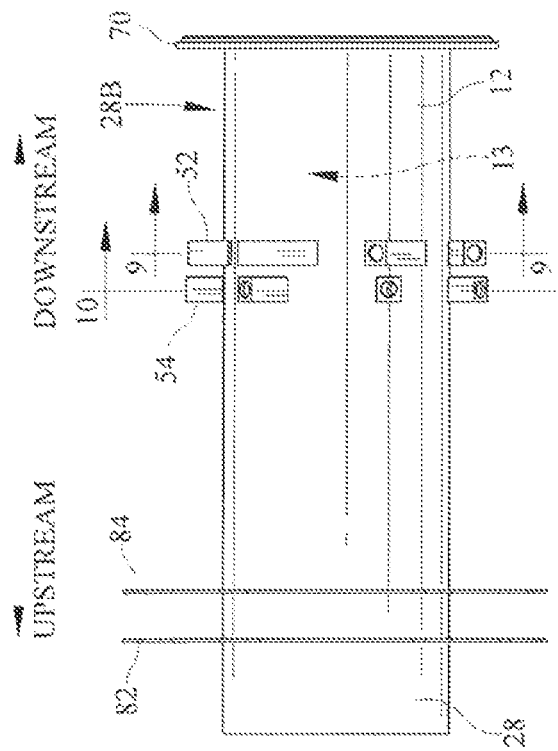
FIG. 8
FIG. 9

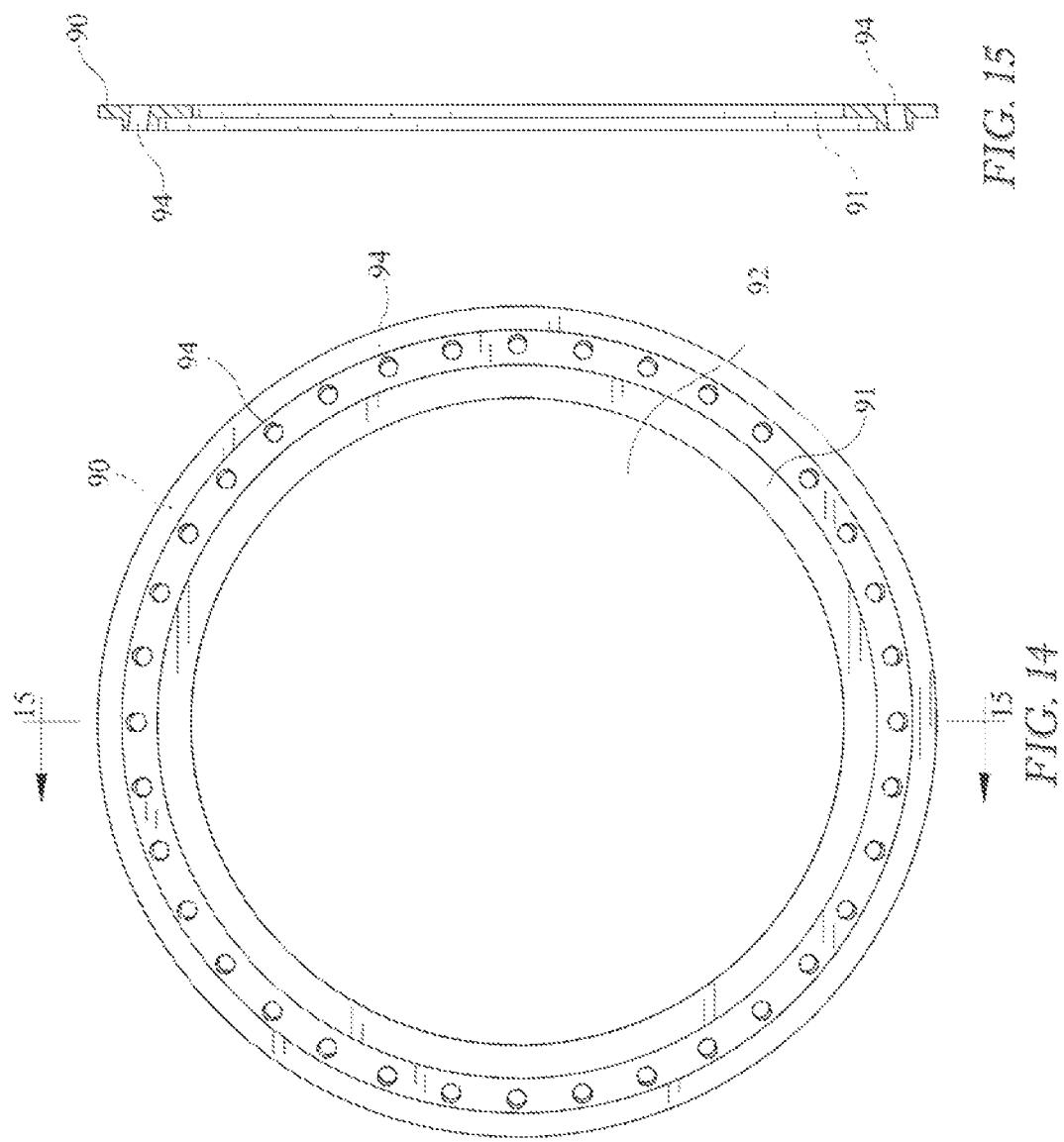

PULVERIZED FUEL-OXYGEN BURNER

PRIORITY INFORMATION

This application is a Continuation of U.S. application Ser. No. 14/372,309, filed Jul. 15, 2014, which claims priority to PCT Application No. PCT/US2013/058129, filed Sep. 5, 2013, the entire specifications of which are incorporated herein by reference.

GOVERNMENT INTEREST STATEMENT

This invention was made with United States government support under contract number DE-FC26-06NT42811, issued by the United States Department of Energy. The United States government has certain rights in this invention.

BACKGROUND AND SUMMARY

The present disclosure relates to burner assemblies, and particularly to oxygen-fuel burner assemblies. More particularly, the present disclosure relates to pulverized solid fuel combustion systems. Many types of coal and other solid fuels can be burned successfully in pulverized form. Coal is pulverized and delivered to fuel-burning equipment and then combusted in a furnace to produce heat for various industrial purposes. A burner is used to "fire" pulverized coal and other solid fuels.

Oxy-fuel combustion is a facilitating technology in the overall plan to reduce greenhouse gases produced from the burning of fossil fuels. Utilizing pure or nearly pure (>90% v/v) oxygen instead of atmospheric air for combustion, removes atmospheric nitrogen (78% v/v) from the fuel burning process and significantly reduces the exhausted combustion products volume by over 75% for an equivalent fuel input. The elimination of atmospheric nitrogen from the exhaust gases concentrates the produced $H_2O$ and $CO_2$ in the exhaust stream. This facilitates $CO_2$ capture through various means such as compression. (Exhaust products of combustion are also known as flue gases, or furnace gases throughout industry).

Coal fired power plants also utilize large volumes of blower driven atmospheric air for transport of the pulverized coal particles to the burner. The term for this transport air in the industry is "primary air". In the overall effort to eliminate atmospheric nitrogen from the process, it is also desired to eliminate the use of this atmospheric air for transport of the pulverized fuel. By substituting conditioned recycled flue gas for the primary air, the pulverized fuel would be transported by a blower driven stream of gases composed mostly (>75% v/v) of $CO_2$. The recycled flue gas would be mostly inert, therefore, having the fuel transported and mixed with an inert gas, increases the possibility of flame instability, poor combustion performance and unacceptable pollutant emissions.

The flue gas from oxy-fuel combustion, conditioned and cleaned in preparation for recycle use, would contain over 75% carbon dioxide ($CO_2$). $CO_2$ is an inert gas and is commonly used in fire extinguishers. Its presence in the burner mixing and flame zones could create flame instability, poor combustion performance, unacceptable percentages of unburned fuel or complete extinction of the flame. In addition, the transport $CO_2$ would lower peak flame temperatures which would reduce the radiant energy transmitted from the flame to the radiant section of the boiler.

A burner designed to operate with recycled flue gas while maintaining flame stability, increased peak flame temperature and producing industry accepted performance, is required to advance carbon capture technology for fossil fuel fired applications.

According to the present disclosure, a burner assembly is provided for combining oxygen and fluidized, pulverized, solid fuel to produce a flame. The burner assembly includes a primary oxygen supply tube adapted to receive a stream of oxygen and a solid fuel conduit arranged to extend through the primary oxygen supply tube to convey a stream of fluidized, pulverized, solid fuel into a flame chamber.

Oxygen flowing through the primary oxygen supply tube passes through a first set of oxygen-injection ports formed or otherwise installed within in the solid fuel conduit and then mixes with fluidized, pulverized, solid fuel passing through the solid fuel conduit. The first set of oxygen-injection ports is arranged so that oxygen flowing there through enters the solid fuel conduit substantially tangential thereto.

Oxygen flowing through the primary oxygen supply tube may also pass through a second set of oxygen-injection ports formed or otherwise installed in the solid fuel conduit and then mix with the fluidized, pulverized, solid fuel passing through the solid fuel conduit. The second set of oxygen-injection ports is arranged so that oxygen flowing there through enters the solid fuel conduit predominantly tangential thereto but with a radial component.

Thus, an oxygen-fuel mixture is created in a downstream portion of the solid fuel conduit and discharged into the flame chamber. This mixture is ignited in the flame chamber to produce a flame.

In illustrative embodiments of the disclosure, the solid fuel conduit extends into and through the primary oxygen supply tube to define an annular primary oxygen flow passage extending around and along an annular exterior surface of the solid fuel conduit in a direction toward the flame chamber. Oxygen flows through this annular primary oxygen flow passage to reach inlets of the oxygen-injection ports in the annular exterior surface of the solid fuel conduit.

In one embodiment, the solid fuel conduit includes a solid-fuel conduit and an oxygen-fuel nozzle coupled to or integral with the solid-fuel conduit and formed to include the oxygen-injection holes. Oxygen and fluidized, pulverized, solid fuel are mixed in the nozzle to create a combustible mixture that is then discharged into the flame chamber and ignited to produce a flame.

In illustrative embodiments of the disclosure, means is provided for mixing some of the oxygen extant in the primary oxygen flow passage provided in the primary oxygen conduit with the oxygen-fuel mixture that is discharged from the solid fuel conduit into the flame chamber. In this case, a first portion of the oxygen flowing through the primary oxygen flow passage is mixed with the stream of fluidized, pulverized, solid fuel just before that fuel exits the solid fuel conduit. A remaining portion of the oxygen flowing through the primary oxygen flow passage is mixed with the oxygenated stream of fluidized, pulverized, solid fuel in a region located outside the solid fuel conduit and near an oxygen-fuel outlet opening formed therein to provide supplemental oxygen to that oxygenated fuel stream and to sweep the end of the oxygen-fuel outlet of ash and the like that may form or be deposited there.

In other illustrative embodiments, a secondary oxygen conduit is provided about the primary oxygen supply tube, forming a secondary oxygen passage therebetween. In such embodiments, oxygen flowing through the secondary oxygen passage is mixed with the oxygenated steam of fluidized, pulverized, solid fuel in a region located outside the solid fuel conduit and near the oxygen-fuel outlet opening formed in the solid fuel conduit to provide supplemental oxygen to that oxygenated fuel stream.

Additional features of the present disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

FIG. 2 is a bottom plan view of an illustrative burner assembly 14 including a solid fuel conduit 28, a primary oxygen conduit 60 surrounding a portion of the solid fuel conduit, a primary oxygen inlet 76 connected to and in fluid communication with the primary oxygen conduit, a secondary oxygen conduit 86 surrounding a portion of the primary oxygen conduit, a secondary oxygen inlet 98 connected to and in fluid communication with the secondary oxygen conduit, an igniter 21, and a flame scanner 31;

FIG. 8 is a detail view of first and second sets of primary oxygen nozzles 52, 54 disposed in the side wall of the solid fuel conduit;

FIG. 9 is an end cross-sectional view of the second set of primary oxygen nozzles 54 showing their locations about the circumference of the side wall of the solid fuel conduit;

FIG. 10 is an end cross-sectional view of the first set of primary oxygen nozzles 52 showing their locations about the circumference of the side wall of the solid fuel conduit;

FIG. 11 is an end view of perforated primary oxygen distribution ring 80;

FIG. 14 is an end view of a secondary oxygen ring 90; and

FIG. 15 is a side view of secondary oxygen ring 90.

DETAILED DESCRIPTION OF THE DRAWINGS

Figure 1:
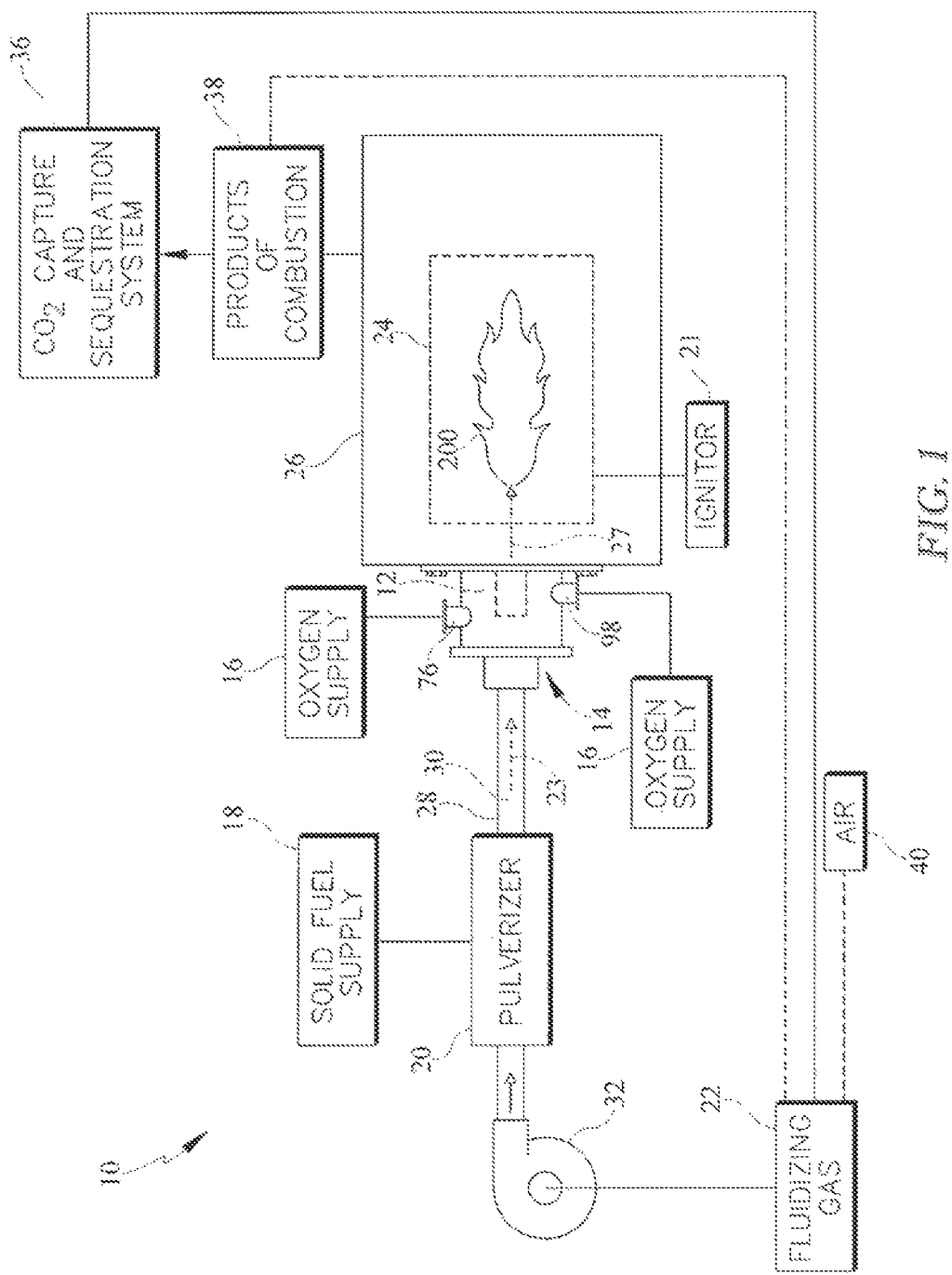
FIG. 1 is a schematic diagram showing an oxygen-fuel combustion system for pulverizing and fluidizing a solid fuel to be fired in an oxygen burner unit.

An oxygen-fuel combustion system 10 for burning a mixture of oxygen and a fluidized, pulverized, solid fuel to produce a flame 200 is shown schematically in FIG. 1. As used herein, "oxygen" means pure oxygen or oxygen in another concentration or another gas in a concentration adequate to support combustion of fuel used in system 10. An oxygen-fuel nozzle 12 is provided in a burner assembly 14 to mix oxygen from oxygen supply 16 with solid fuel from solid fuel supply 18 after the solid fuel is pulverized using a pulverizer 20 and fluidized using a fluidizing (or "transport") gas 22. The fluidized, pulverized, solid fuel 23 is oxygenated and then discharged into a flame chamber 24 provided in a boiler or furnace 26 to produce a flame 200.

A solid-fuel conduit 28 is formed to include a fuel transport passageway 30 for conveying pulverized solid fuel discharged from pulverizer 20 to oxygen-fuel nozzle 12. A blower 32 or other suitable apparatus or system is used to discharge fluidizing gas 22 into the pulverizer 20 to fluidize the pulverized solid fuel 25 that is admitted into fuel transport passageway 30. Fluidizing gas 22 is used to fluidize and convey the pulverized solid fuel 25 through oxygen-fuel nozzle 12 and into flame chamber 24. Oxygen provided by oxygen supply 16 is conducted though a primary oxygen conduit 60 to oxygen-fuel nozzle 12 to be mixed with fluidized, pulverized, solid fuel 23 flowing through solid-fuel conduit 28. This fuel-oxygen mixture is discharged from oxygen fuel nozzle 12 into flame chamber 24. Additional oxygen provided by oxygen supply 16 (or another oxygen supply) is conducted through a secondary oxygen conduit 86 into flame chamber 24 to be mixed with the fuel-oxygen mixture discharged from oxygen-fuel nozzle 12 to create a combustible oxygen-fuel mixture 27 that is ignited in flame chamber 24 using a suitable ignitor 21 to produce a flame. The fuel-oxygen mixture discharged from oxygen-fuel nozzle 12 typically would be stoichiometrically lean to inhibit combustion from occurring within oxygen-fuel nozzle 12. The additional oxygen provided through secondary oxygen conduit 86 typically would increase the oxygen content of the fuel-oxygen mixture so as to support complete combustion of the fuel in flame chamber 24.

Many gases are suitable for use in fluidizing pulverized solid fuel discharged into fuel transport passageway 30. In one illustrative embodiment, a carbon dioxide ($CO_2$) capture and sequestration system 36 is used to capture carbon dioxide generated during combustion in boiler or furnace 26 so that a portion of the captured carbon dioxide is used as the fluidizing gas 22. In another illustrative embodiment, conditioned products of combustion 38 generated during combustion in boiler or furnace 26 provide fluidizing gas 22. In yet another illustrative embodiment, air 40 from any suitable source is used as the fluidizing gas 22.

Oxygen-fuel combustion system 10 is configured to allow the burning of any solid fuel, or waste fuel, that can be pulverized or ground and conveyed by air or gas. Just as pulverized coal can be conveyed by air or carbon dioxide, solid fuels such as petroleum coke, lignite, sawdust, agricultural wastes, ground shells, etc. could be burned in oxygen-fuel combustion system 10 to produce a flame 200 and to satisfy many industrial heating or other needs.

Figure 2:
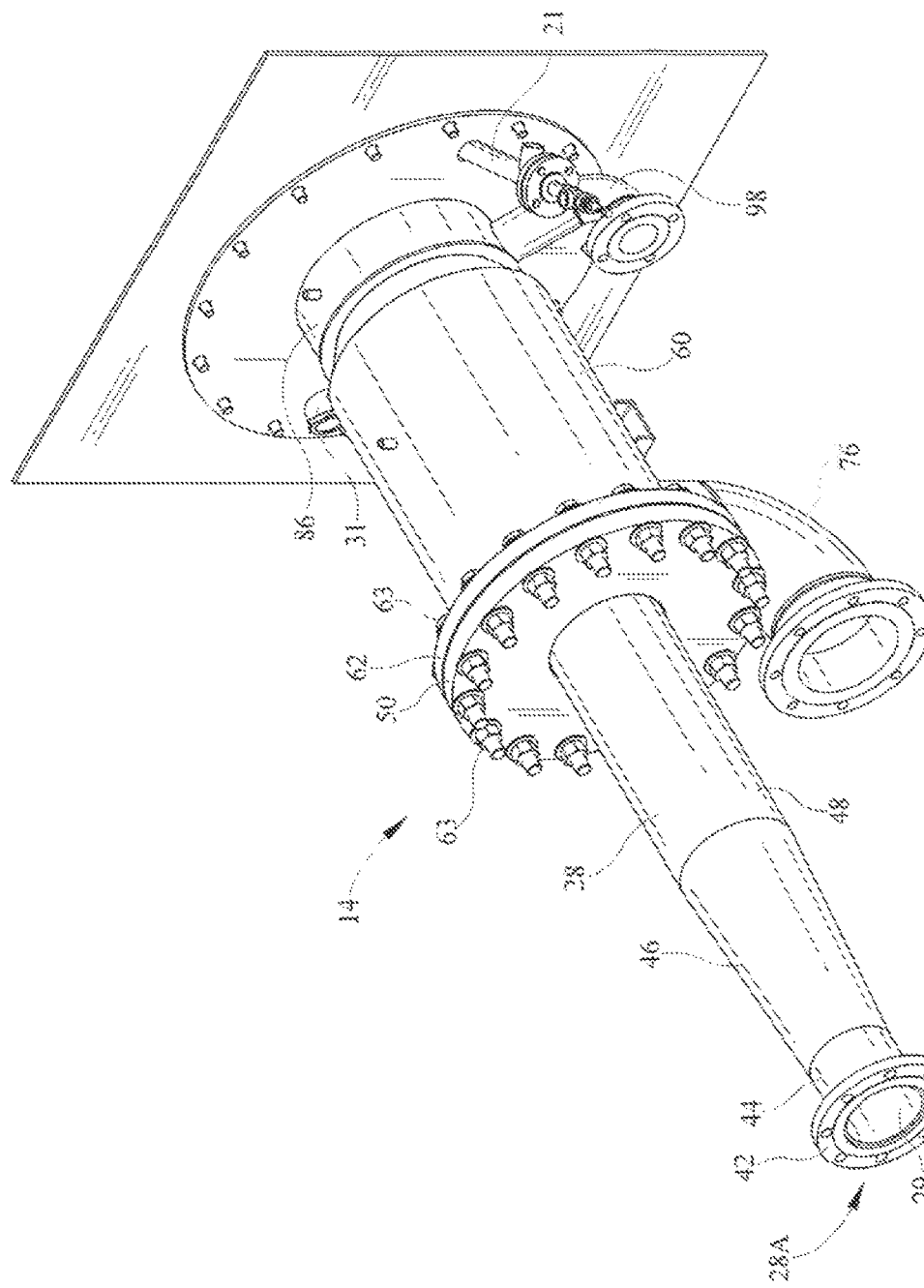
FIG. 2 is a perspective view of an illustrative burner assembly
Figure 3:
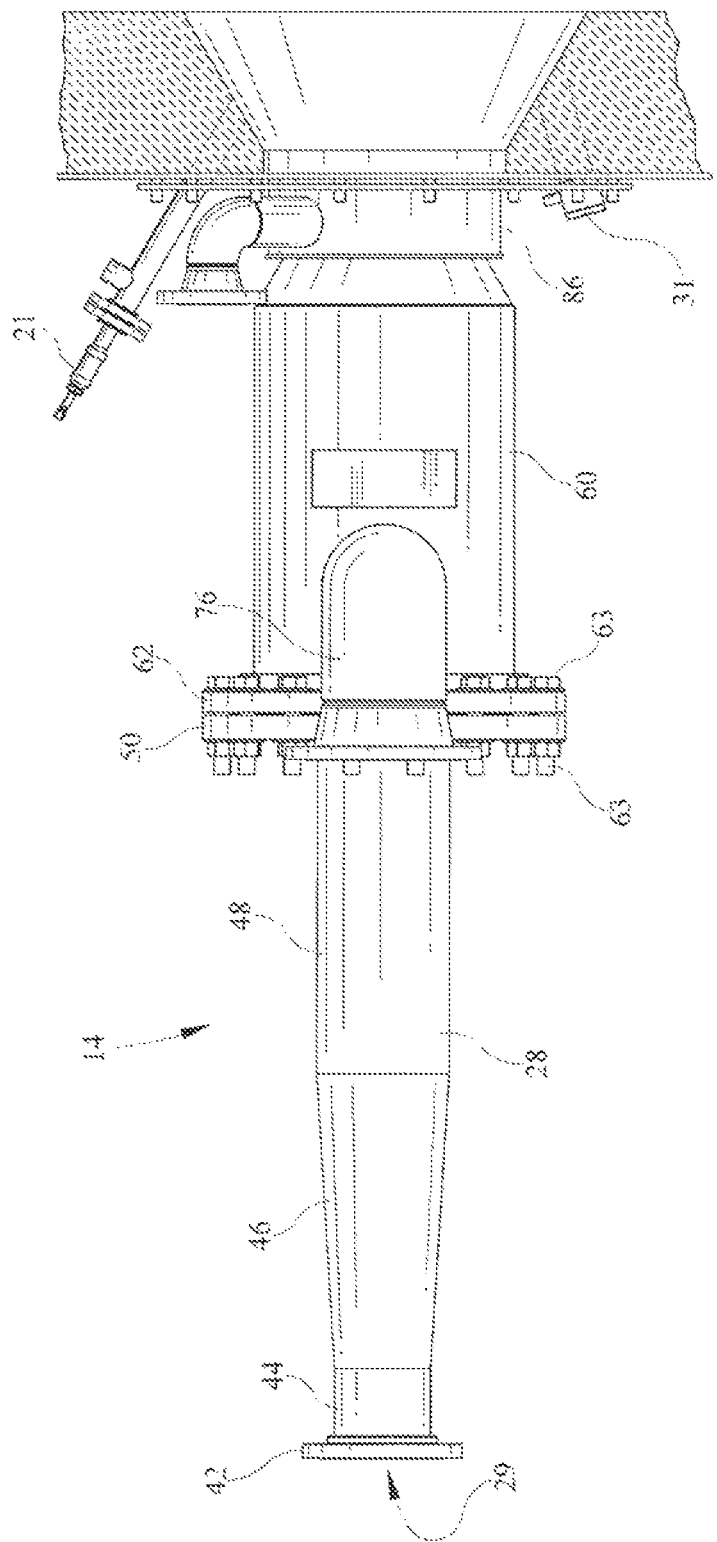
FIG. 3 is a bottom plan view of the illustrative burner assembly of FIG. 2.

FIGS. 2-15 show illustrative burner assembly 14 in greater detail. As best shown in FIGS. 2, 3 and 5, burner assembly 14 includes solid fuel conduit 28 having first and second ends 28A, 28B. In this embodiment, solid fuel conduit 28 is generally tubular. First end 28A of solid fuel conduit 28 includes a flange 42 connected to a first end of a first cylindrical tube section 44. A second end of first cylindrical tube section 44 is connected to a first end of a frusto-conical expanding tube section 46. A second end of frusto-conical expanding tube section 46 is connected to a first end of a second cylindrical tube section 48. A flange 50 is connected to solid fuel conduit 28 between conically expanding tube section 46 and a second end of second cylindrical tube section 48. Each of the foregoing sections could be embodied as a monolithic element or as a plurality of similar elements connected together. The foregoing elements of solid fuel conduit 28 could be made of steel or another sufficiently durable metal or other material joined by welded or other suitable connections, as would be understood by one skilled in the art.

As best shown in FIGS. 5 and 8, solid fuel conduit 28 defines a fuel-oxygen nozzle 12 coextensive with second end 28B of solid fuel conduit 28. Fuel-oxygen nozzle 12 includes a side wall and defines a fuel-oxygen mixing region and a fuel-oxygen transport passage 13 therein. As best shown in FIG. 8, a first set of primary oxygen injection nozzles 52 penetrates the sidewall of fuel-oxygen nozzle 12. A second set of primary oxygen nozzles 54 penetrates the sidewall of fuel-oxygen nozzle 12 near first set of primary oxygen nozzles 52 and upstream thereof. The nozzles of first and second sets of primary oxygen nozzles 52, 54 are illustrated as tubular members joined to the sidewall of fuel-oxygen nozzle 12 and in fluid communication with fuel transport passageway 30 and with primary oxygen passageway 58, discussed further below, via corresponding apertures 56 formed into the annular sidewall of fuel-oxygen nozzle 12.

As best shown in FIG. 9, each nozzle in first set of primary oxygen nozzles 52 is arranged to define a flow path there through generally tangential to the sidewall of fuel-oxygen nozzle 12. In other embodiments, the flow path defined by the nozzles of first set of primary oxygen nozzles 52 could be less than tangential, that is, it could include a radial component. As best shown in FIG. 10, each nozzle in second set of primary oxygen nozzles 54 is arranged to define a flow path there through, which flow path is about midway between tangential and radial to the sidewall of fuel-oxygen nozzle 12. In other embodiments, the flow path defined by the nozzles of second set of primary oxygen injection nozzles could include a greater or lesser radial component. The flow paths defined by the nozzles in first and second sets of primary oxygen injection nozzles 52, 54 are generally orthogonal to the length or longitudinal dimension or axis of solid fuel conduit 28.

Figure 13:
FIG. 13 is a side view of nozzle sweep ring 70.
Figure 12:
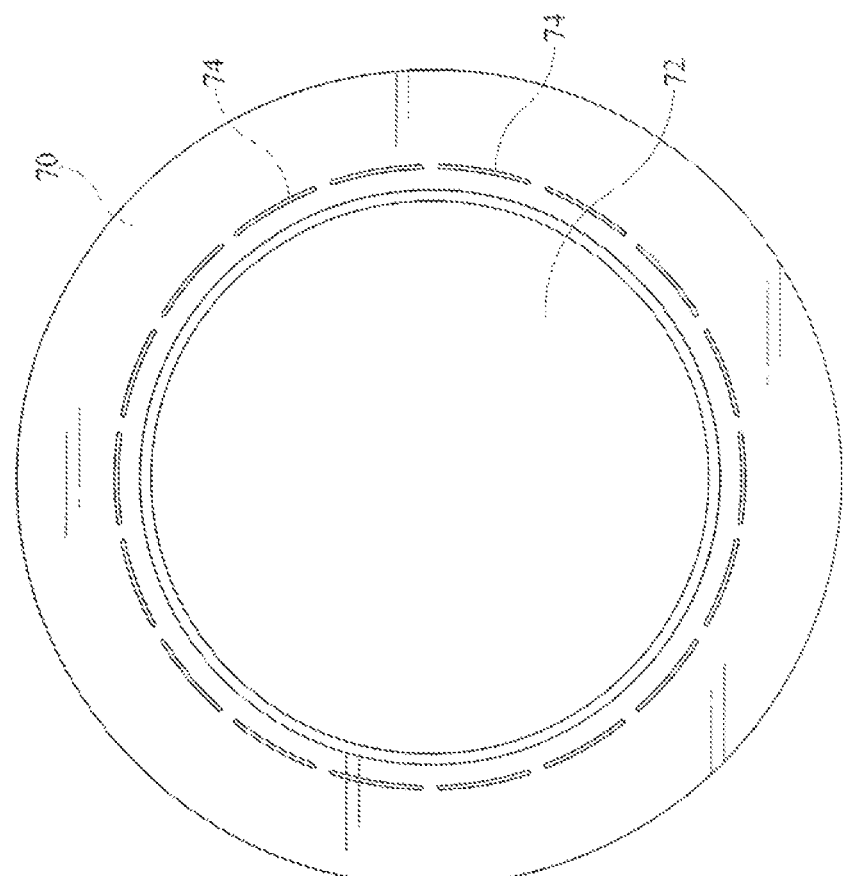
FIG. 12 is an end view of a nozzle sweep ring 70.

A nozzle sweep ring 70 is welded or otherwise connected to second end 28B of solid fuel conduit 28. As best shown in FIG. 13, nozzle sweep ring 70 generally has the form of a flat ring defining an interior aperture 72. Nozzle sweep ring 70 may be connected to the downstream end of solid fuel conduit 28 such that fuel-oxygen passageway 13 defined thereby is generally coextensive and/or concentric with interior aperture 72. The outer circumference of nozzle sweep ring 70 is configured to be received by a primary oxygen conduit 60, as discussed further below.

Nozzle sweep ring 70 defines a raised circumferential rib 71 extending axially outwardly from a face thereof, proximate the outer circumference thereof. Rib 71 is configured to be received by a relief 91 formed into a secondary oxygen ring 90, as will be discussed further below.

Nozzle sweep ring 70 also defines a plurality of spaced-apart circumferential slots 74 located near, but spaced from, an inner diameter thereof. Eighteen slots 74 are illustrated, but more or fewer slots could be provided. The number, positioning, and total swept area of the slots is selected to provide sufficient oxygen flow therethrough to sweep away ash or the like that otherwise may form or be deposited at the open end of solid fuel conduit 28 during burner operation, as would be understood by one skilled in the art, and as discussed further below.

First and second perforated primary oxygen distribution rings 80, 82 are disposed about solid fuel conduit 28 at locations between primary oxygen inlet pipe 76 and first and second sets of primary oxygen nozzles 52, 54. First and second perforated primary oxygen distribution rings 80, 82 may be welded or otherwise attached to an exterior surface of solid fuel conduit 28. The outer circumference of each of perforated primary oxygen distribution rings 80, 82 is configured to be received by an interior surface of primary oxygen conduit 60 in sliding engagement therewith.

Each perforated primary oxygen distribution ring 80, 82 generally has the form of a flat ring having an aperture therein for receiving solid fuel conduit 28. Each perforated primary oxygen distribution ring 80, 82 also defines a plurality of apertures 84 in the ring portion thereof. Apertures 84 may comprise about 40-70% of the surface area of the disc portion of each perforated primary oxygen distribution ring 82, 84, or a greater or lesser percentage, as would be understood by one skilled in the art. First and second perforated primary oxygen distribution rings 80, 82 function to distribute oxygen from primary oxygen inlet pipe 76 about the circumference of a primary oxygen passageway 58, as discussed further below and as would be recognized by one skilled in the art.

A generally annular primary oxygen conduit 60 is located generally concentrically about solid fuel conduit 28. As such, primary oxygen conduit 60 and solid fuel conduit 28 cooperate to define a generally annular primary oxygen passageway 58 about solid fuel conduit 28. In the illustrated embodiment, primary oxygen conduit 60 extends from about the midpoint of solid fuel conduit 28 to about second end 28B thereof.

Primary oxygen conduit 60 includes a flange 62 or other closure member connected to a first or upstream end of a first cylindrical section 64 thereof. Flange 62 is configured for bolted attachment to flange 42 connected to solid fuel conduit 28 using suitable fasteners 63, as would be understood by one skilled in the art. One or more o-rings 43 retained or otherwise disposed in corresponding grooves in flange 42 and/or flange 62 provide a seal between flange 42 and flange 62. Alternatively, a suitable gasket could be located between flanges 42 and 62 to provide such a seal. First cylindrical section 64 is configured to receive first and second perforated primary oxygen distribution rings 80, 82 in sliding engagement therein.

Primary oxygen conduit also includes a frusto-conical reducing section 66 and a second cylindrical section 68. A first or upstream end of frusto-conical reducing section 66 is connected to second or downstream end of first cylindrical section 64. A second or downstream end of frusto-conical reducing section 66 is connected to a first or upstream end of a second cylindrical section 68. Second cylindrical section 68 is configured to receive nozzle sweep ring 70 in sliding engagement therein.

A secondary oxygen conduit 86 is located concentrically about second cylindrical section 68 of primary oxygen conduit 60. As such, secondary oxygen conduit 86 and second cylindrical section 68 of primary oxygen conduit 60 cooperate to define a secondary oxygen passageway 96. A support ring 88 or other closure member is welded or otherwise connected in sealed engagement to secondary oxygen conduit 86 and primary oxygen conduit 60, thereby covering the first or upstream annular opening defined by the juxtaposition thereof. Support ring 88 may be attached, for example, to a first or upstream end of secondary oxygen conduit 86 and to the sidewall of second cylindrical section 68 of primary oxygen conduit 60.

A secondary oxygen ring 90 is welded or otherwise connected in sealed engagement to the second or downstream ends of primary oxygen conduit 60 and secondary oxygen conduit 86, thereby generally covering the second or downstream annular opening defined thereby. As best shown in FIGS. 13 and 14, secondary oxygen ring 90 has the form of a generally planar ring defining an aperture 92 in the center thereof. Secondary oxygen ring 90 may be connected to the downstream ends of primary oxygen conduit 60 and secondary oxygen conduit 86 such that aperture 92 is generally coextensive and/or concentric with primary oxygen passageway 58.

Secondary oxygen ring 90 defines a plurality of apertures 94 arranged circumferentially thereabout. Apertures 94 may be formed such that their centerlines are parallel to the axis of the ring 90. Alternatively, as shown in FIG. 14, apertures 94 may be formed such that their centerlines converge toward the axis of the ring 90.

Secondary oxygen ring 90 also defines a relief 91 extending axially inwardly from a first or upstream face thereof and coextensive with aperture 92. Relief 91 is configured to receive rib 71 of nozzle sweep ring 70 when solid fuel conduit 28 is assembled to primary oxygen conduit 60. With solid fuel conduit 28 so assembled to primary oxygen conduit 60, nozzle sweep ring 70 covers the downstream annular opening defined by the juxtaposition of solid fuel conduit 28 and primary oxygen conduit 60.

A primary oxygen inlet pipe 76 is connected to primary oxygen conduit 60 near a first end thereof and in fluid communication with primary oxygen passageway 58 through a corresponding aperture 78 in the side wall of primary oxygen conduit 60. Primary oxygen inlet pipe 76 may be welded or otherwise connected to the sidewall of primary oxygen conduit 60.

As would be recognized by one skilled in the art, primary oxygen passageway 58 can receive oxygen under pressure from primary oxygen inlet pipe 76 and distribute such oxygen to and through apertures 84 of perforated primary oxygen distribution rings 80, 82, the nozzles of first and second sets of primary oxygen nozzles 52, 54, and slots 74 of nozzle sweep ring 70.

A secondary oxygen inlet pipe 98 is connected to secondary oxygen conduit 86 and is in fluid communication with secondary oxygen passageway 96 in a manner similar to that in which primary oxygen inlet pipe 76 is connected to primary oxygen conduit 60. As would be recognized by one skilled in the art, secondary oxygen passageway 96 can receive oxygen under pressure from secondary oxygen inlet pipe 98 and distribute such oxygen to and through apertures 94 of secondary oxygen ring 90.

A volume displacement member 100 is disposed concentrically within solid fuel conduit 28. As such, the juxtaposition of volume displacement member 100 and solid fuel conduit 28 defines an annular region 102 therebetween. Volume displacement member 100 is shaped such that the cross-sectional area of annular region 102 upstream of expansion area 104, described further below, remains generally constant and generally equivalent to the cross-sectional area of inlet portion 29 of solid fuel conduit 28. The terms "generally constant" and "generally equivalent" as used in this context include fluctuations or variations of up to about 10%.

In the illustrated embodiment, volume displacement member 100 includes a frusto-conical nose section 106. Nose section 106 is substantially conical but has a blunt nose. A pointed nose could be substituted for the blunt nose, but a pointed nose could be more susceptible to erosion or other damage from a stream of fuel and transport gas flowing through solid fuel conduit 28 and across the surface of volume displacement member 100. The surface of nose section 106 may define an angle of about 15-45° from the centerline of volume displacement member 100 or a greater or lesser angle. In one embodiment, the surface of nose section 106 may define an angle of about 40° from the centerline of volume displacement member.

The broader end of nose section 106 (opposite the nose thereof) is connected to a first end of a conically expanding section 108. A second end of expanding section 108 is connected to a first end of a cylindrical section 110. A second end of cylindrical section 110 is connected to a first end of a conically contracting section 112. A second, downstream end of contracting section 112 is blunt. Each of the foregoing elements of volume displacement member 100 could be embodied as a monolithic element or as a plurality of similar elements connected together. For example, cylindrical section 110 could be embodied as a plurality of cylindrical sub-sections connected together. The foregoing elements of volume displacement member 100 could be made of steel or another sufficiently durable metal joined by welded connections, as would be understood by one skilled in the art. Any or all portions of volume displacement member 100 could be solid or hollow. Hollow portions thereof could be made from, for example, rolled sheet metal or pipe.

Figure 4:
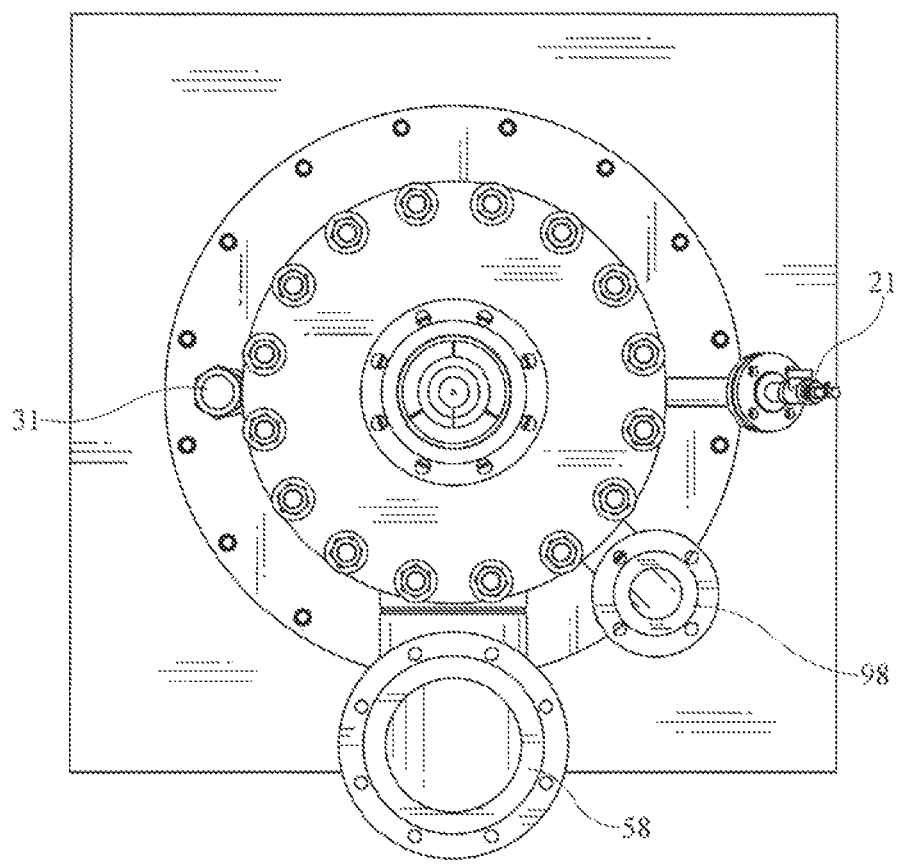
FIG. 4 is an end view of the illustrative burner assembly of FIG. 2.
Figure 5:
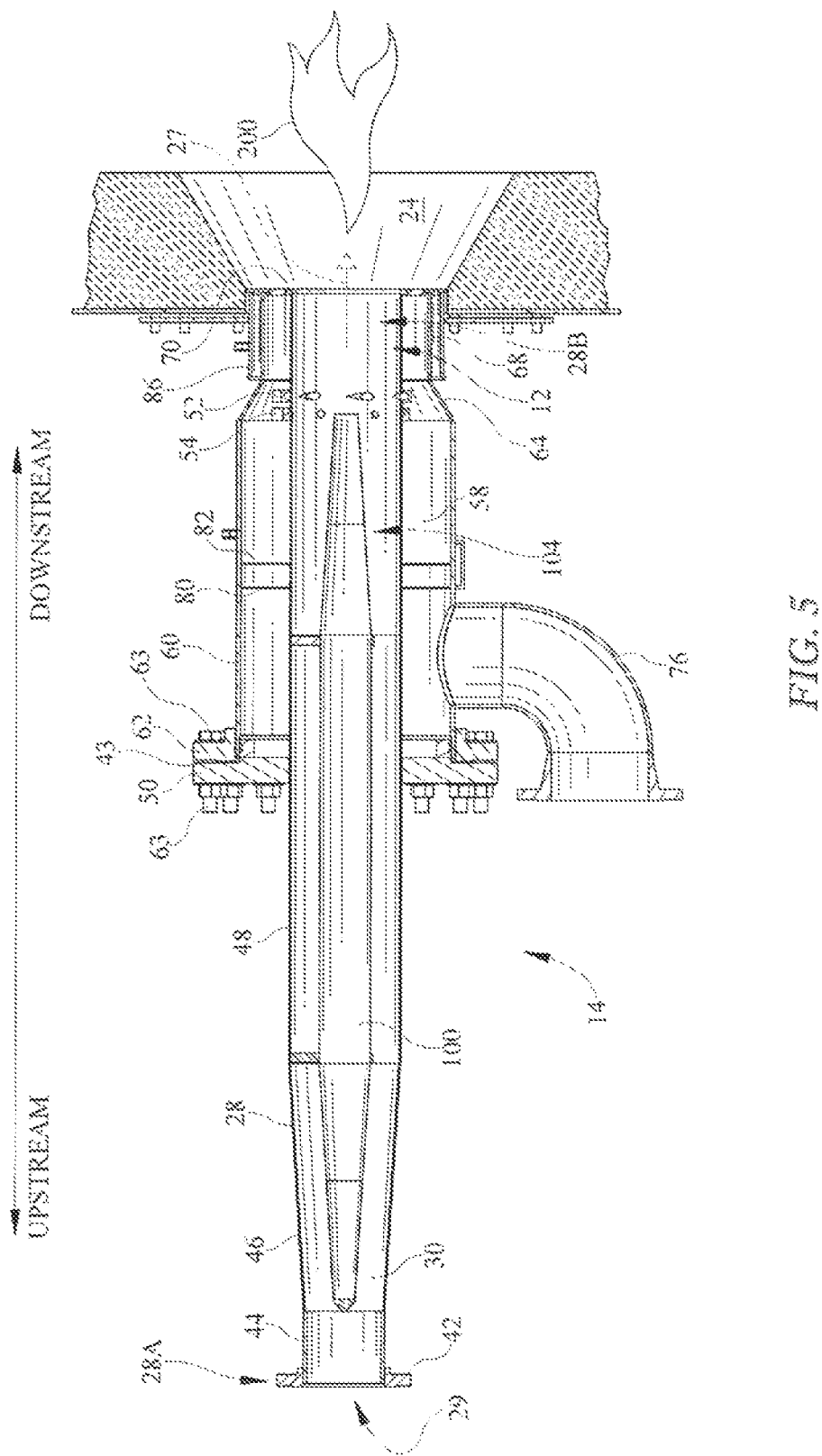
FIG. 5 is a side cross-sectional view of the illustrative burner assembly of FIG. 2 further including a volume displacement member 100 disposed within the solid fuel conduit, first and second perforated primary oxygen distribution rings 80, 82 disposed in an annular primary oxygen passage 58 defined by the solid fuel conduit and the primary oxygen conduit, first and second sets of primary oxygen nozzles 52, 54 disposed in and extending through the wall of a fuel-oxygen nozzle 12 defined by a downstream end of solid fuel conduit 28, and a secondary oxygen ring 90 covering an end of an annular secondary oxygen passage 96 defined by the primary oxygen conduit and the secondary oxygen conduit.
Figure 6:
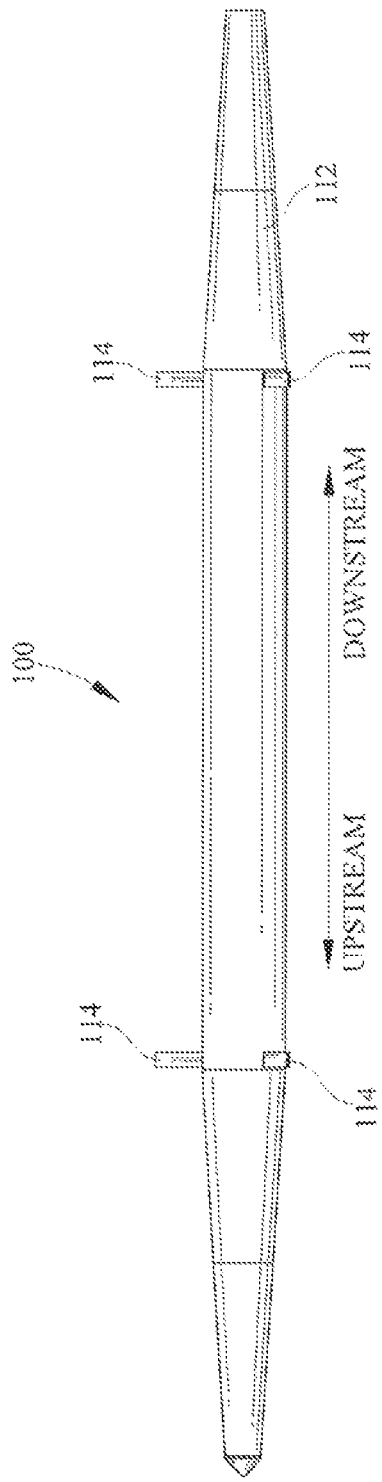
FIG. 6 is a side elevation view of volume displacement member 100.
Figure 7:
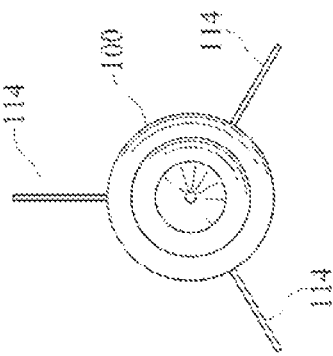
FIG. 7 is an end view of volume displacement member 100 and support pins 114 locating the volume displacement member within the solid fuel conduit.

As best illustrated in FIGS. 4, 6, and 7, volume displacement member 100 is attached to an interior surface of the sidewall of solid fuel conduit 28 by means of support pins 114. Support pins 114 may be made of steel or another durable metal welded to both volume displacement member 100 and solid fuel conduit 28. Six support pins 114 are used in the illustrative embodiment, but more or fewer support pins 114 could be used in other embodiments. In the illustrated embodiment, three support pins 114 extend radially outward from one end of cylindrical section 110 of volume displacement member 100. Another three support pins 114 extend radially outward from the other end thereof in a similar manner. The support pins in each set of three support pins are shown as being generally equally spaced about the circumference of volume displacement member 100, but could be spaced otherwise.

As mentioned above, volume displacement member 100 is located within solid fuel conduit 28 so as to create an annular region 102 between volume displacement member 100 and solid fuel conduit 28, with annular region 102 having a generally constant cross-sectional area which is generally equal to the cross sectional area of the fuel/transport gas inlet 29 of solid fuel conduit 28. In the illustrated embodiment, the first end of volume displacement member 100 is generally aligned with the first end of conically expanding section 46 of solid fuel conduit 28, and the second end of volume displacement member 100 is generally aligned with second set of primary oxygen injection nozzles 54 penetrating solid fuel conduit 28, as discussed above.

Flame scanner 31 and ignitor 21 are provided at second end of burner assembly 14 in a manner understood by one skilled in the art. Burner assembly 14 may be attached to a boiler or other flame chamber in a manner understood by one skilled in the art.

In operation, pulverized solid fuel 25 enters fuel transport passage 30 defined by solid-fuel conduit 28 and is fluidized and transported therethrough by fluidizing gas 22, which is propelled by blower 32. As the flow of transport gas and fluidized solid fuel enters expanding 46 section of solid fuel conduit 28, the flow velocity remains substantially constant because volume displacement member 100 is configured to keep the cross-sectional flow area substantially constant from inlet 21 of solid fuel conduit 28 to the beginning of fuel-oxygen nozzle 12. The flow velocity begins to decrease when the flow of transport gas and fluidized solid fuel reaches reducing section 112 of volume displacement member 100 because the cross-sectional flow area begins to increase at that point. The flow velocity then increases due to introduction of primary oxygen through first and second sets of primary oxygen injection nozzles 52, 54. Also, the mixture of fluidized, pulverized solid fuel and oxygen established in fuel-oxygen nozzle 12 begins to swirl because of the tangential component of the oxygen injected through primary oxygen injection nozzles 52, 54.

Primary oxygen is admitted to primary oxygen passage 58 from oxygen supply 16. The primary oxygen flows from oxygen supply 16 through perforated primary oxygen rings 80, 82, which serve to distribute oxygen about primary oxygen passage 58. The major portion of the primary oxygen flows through the nozzles of the first and second sets of primary oxygen injection nozzles 52, 54 and into fuel-oxygen passage 13 defined by fuel-oxygen nozzle 12, where it mixes with the fluidized, pulverized solid fuel.

A minor portion of the primary oxygen is admitted to flame chamber 24 downstream of burner assembly 14 through slots 74 in nozzle sweep ring 70. This "sweep" oxygen sweeps ash from second end 28B of burner assembly 14 that otherwise may form or be deposited there.

Secondary oxygen is admitted to secondary oxygen passage 96 from oxygen supply 16. The secondary oxygen flows through apertures 94 of secondary oxygen ring 90 and into flame chamber 24. The secondary oxygen further supports combustion of the fluidized, pulverized solid fuel. The ratio of primary oxygen to solid fuel established in fuel-oxygen nozzle 12 may be less than stoichiometric to inhibit combustion within fuel-oxygen nozzle 12. The addition of secondary oxygen to the fuel oxygen mixture discharged from fuel-oxygen nozzle 12 may bring the ratio of primary and secondary oxygen to fuel to stoichiometric or more or less, as desired, and as would be understood by one skilled in the art.

The supply of oxygen to primary and secondary oxygen passages is regulated by control valves and selection of open area in secondary oxygen ring 90.

The invention claimed is:

1. A burner assembly for combining fuel and oxygen to produce a combustible fuel-oxygen mixture, the burner assembly comprising:
a solid fuel conduit, wherein:
the solid fuel conduit is formed to include a fuel transport passage for transporting fluidized, pulverized solid fuel; and
the solid fuel conduit defines a fuel-oxygen nozzle, wherein the fuel-oxygen nozzle has a side wall and is formed to include a fuel-oxygen transport passage;
a first plurality of oxygen injection nozzles located in the side wall of the fuel-oxygen nozzle, wherein each of the first plurality of oxygen injection nozzles define a flow path there through that is tangential to the side wall of the fuel-oxygen nozzle; and
a second plurality of oxygen injection nozzles located in the side wall of the fuel-oxygen nozzle, wherein each of the second plurality of oxygen injection nozzles define a flow path there through that is less than tangential and includes a radial component relative to the side wall of the fuel-oxygen nozzle.

2. The burner assembly of claim 1, wherein the fuel-oxygen nozzle is coextensive with an end of the solid fuel conduit.

3. The burner assembly of claim 1, wherein the flow path defined through each of the second plurality of oxygen injection nozzles is midway between tangential and radial to the side wall of the fuel-oxygen nozzle.

4. The burner assembly of claim 1, wherein the second plurality of oxygen injection nozzles are located near the first plurality of oxygen injection nozzles.

5. The burner assembly of claim 1, wherein the second plurality of oxygen injection nozzles are located upstream from the first plurality of oxygen injection nozzles.

6. The burner assembly of claim 1, wherein the first and second plurality of oxygen injection nozzles are tubular members.

7. The burner assembly of claim 1, wherein the first and second plurality of oxygen injection nozzles are in fluid communication with the fuel transport passage via apertures formed on the side wall of the fuel-oxygen nozzle.

8. The burner assembly of claim 1, wherein the flow path defined through each of the first and second plurality of oxygen injection nozzles is orthogonal to a longitudinal axis in the longitudinal direction of the solid fuel conduit.

9. A burner assembly for combining fuel and oxygen to produce a combustible fuel-oxygen mixture, the burner assembly comprising:
a solid fuel conduit, wherein:
the solid fuel conduit is formed to include a fuel transport passage for transporting fluidized, pulverized solid fuel; and
the solid fuel conduit defines a fuel-oxygen nozzle, wherein the fuel-oxygen nozzle has a side wall and is formed to include a fuel-oxygen transport passage;
an oxygen conduit located about the fuel-oxygen nozzle, wherein the oxygen conduit is formed to include an oxygen inlet and an oxygen passage;
a first plurality of oxygen injection nozzles located in the side wall of the fuel-oxygen nozzle, wherein each of the first plurality of oxygen injection nozzles define a flow path there through that is tangential to the side wall of the fuel-oxygen nozzle;
a second plurality of oxygen injection nozzles located in the side wall of the fuel-oxygen nozzle, wherein each of the second plurality of oxygen injection nozzles define a flow path there through that is less than tangential and includes a radial component relative to the side wall of the fuel-oxygen nozzle; and
an oxygen distribution ring located within the oxygen passage between the oxygen inlet and the first and second plurality of oxygen injection nozzles, wherein the oxygen distribution ring defines a plurality of apertures in fluid communication with the oxygen inlet and the first and second plurality of oxygen injection nozzles.

10. The burner assembly of claim 9, further comprising an additional oxygen distribution ring located in the oxygen passage between the oxygen distribution ring and the first and second plurality of oxygen injection nozzles, wherein the additional oxygen distribution ring defines an additional plurality of apertures in fluid communication with the oxygen inlet and the first and second plurality of oxygen injection nozzles.

11. The burner assembly of claim 9, wherein the solid fuel conduit further defines an inlet opening for receiving the fluidized, pulverized solid fuel.

12. The burner assembly of claim 9, wherein the fuel-oxygen nozzle is formed to include a fuel inlet opening located to admit the fluidized, pulverized solid fuel from the fuel transport passage into the fuel-oxygen transport passage.

13. The burner assembly of claim 9, wherein the fuel-oxygen nozzle is formed to include a fuel-oxygen outlet opening located to discharge a fuel-oxygen mixture into a flame chamber.

14. The burner assembly of claim 9, wherein the first and second plurality of oxygen injection nozzles are configured to admit oxygen from the oxygen passage into the fuel-oxygen nozzle in a direction orthogonal to a longitudinal axis in the longitudinal direction of the solid fuel conduit.

15. The burner assembly of claim 9, further comprising a volume displacement member positioned within the solid fuel conduit and defining an annular flow region.

16. The burner assembly of claim 9, further comprising an additional oxygen conduit located about the oxygen conduit, wherein the additional oxygen conduit is formed to include an additional oxygen inlet and an additional oxygen passage.

17. A method for operating a burner assembly for combining fuel and oxygen to produce a combustible fuel-oxygen mixture, comprising:
   receiving, by a solid fuel conduit, fluidized, pulverized solid fuel;
   transporting the received fluidized, pulverized solid fuel through a fuel transport passage of the solid fuel conduit;
   admitting the fluidized, pulverized solid fuel from the fuel transport passage into a fuel-oxygen transport passage of a fuel-oxygen nozzle defined by the solid fuel conduit;
   admitting, from an oxygen passage of an oxygen conduit located about the fuel-oxygen nozzle, oxygen into the fuel-oxygen nozzle through a first plurality of oxygen injection nozzles located in a side wall of the fuel-oxygen nozzle, wherein the oxygen is admitted into the fuel-oxygen nozzle through the first plurality of oxygen injection nozzles in a flow path that is tangential to the side wall of the fuel-oxygen nozzle; and
   admitting, from the oxygen passage of the oxygen conduit located about the fuel-oxygen nozzle, additional oxygen into the fuel-oxygen nozzle through a second plurality of oxygen injection nozzles located in the side wall of the fuel-oxygen nozzle, wherein the additional oxygen is admitted into the fuel-oxygen nozzle through the second plurality of oxygen injection nozzles in a flow path that is less than tangential and includes a radial component relative to the side wall of the fuel-oxygen nozzle.

18. The method of claim 17, wherein the method includes mixing the oxygen admitted into the fuel-oxygen nozzle through the first plurality of oxygen injection nozzles and the additional oxygen admitted into the fuel-oxygen nozzle through the second plurality of oxygen injection nozzles with the fluidized, pulverized solid fuel admitted into the fuel-oxygen transport passage of the fuel-oxygen nozzle to establish a combustible fuel-oxygen mixture flowing in the fuel-oxygen transport passage.

\* \* \* \* \*